(12) United States Patent
Okayama et al.

(10) Patent No.: US 6,320,998 B1
(45) Date of Patent: Nov. 20, 2001

(54) OPTICAL SWITCH FOR SELECTIVELY CONNECTING AN OPTICAL INPUT TERMINAL WITH AN OPTICAL OUTPUT TERMINAL

(75) Inventors: Hideaki Okayama; Hironori Sasaki, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/448,517

(22) Filed: Nov. 24, 1999

(30) Foreign Application Priority Data

Nov. 30, 1998 (JP) .................................. 10-339592

(51) Int. Cl.[7] ...................................... G02B 6/26
(52) U.S. Cl. .................. 385/22; 385/16; 385/20
(58) Field of Search .................. 385/22, 16, 17, 385/18, 19, 20, 21, 23

(56) References Cited

U.S. PATENT DOCUMENTS 6,005,993 * 12/1999 MacDonald ............................ 385/16

OTHER PUBLICATIONS

Title: *Free–Space Micromachined Optical Switches with Submillisecond Switching Time for Large—Scale Optical Crossconnects.* Author : L. Y. Lin et al., Apr. 4, 1998, pp. 525–527.

* cited by examiner

*Primary Examiner*—Phan T. H. Palmer
(74) *Attorney, Agent, or Firm*—Rabin & Berdo, P.C.

(57) ABSTRACT

An optical switch includes an optical input terminal, a first deflector disposed to receive light from the optical input terminal, controlled to change its deflection angle, second deflectors arranged in a substrate, the first deflector transmits light from the optical input terminal to one of the second deflectors selectively, and optical output terminals disposed to receive light from the second deflectors, the second deflectors transmit light from the first deflector to the optical output terminals.

9 Claims, 5 Drawing Sheets

OPTICAL SWITCH FOR SELECTIVELY CONNECTING AN OPTICAL INPUT TERMINAL WITH AN OPTICAL OUTPUT TERMINAL

FIELD OF THE INVENTION

The invention relates to an optical switch, which connects selectively an optical input terminal with an optical output terminal.

BACKGROUND OF THE INVENTION

A conventional micro-mechanical optical switch is described, for example, in Photonics Technology Letters, vol. 10, pp. 525–527, April, 1998. An optical switch described in this publication includes input optical fibers disposed along one side of a rectangular substrate, output optical fibers disposed along the crossing side, and movable mirrors arranged in a matrix on the substrate. The movable mirrors further include actuators that convert electric energy into mechanical actions.

Each of the movable mirrors reflects light toward determined direction. Therefore, required number of the movable mirrors is product between the number of input ports and output ports.

In general, the number of the mirrors in a single substrate is limited to around 2500, because cubic content of the actuator is larger than the mirror. When numbers of the input ports and the output ports are equal, those numbers are respectively limited to around 50.

SUMMARY OF THE INVENTION

It is therefore an object of the invention to provide an optical switch, which solve the above-described problem. According to the present invention, such an optical switch includes an optical input terminal, a first deflector disposed to receive light from the optical input terminal, controlled to change its deflection angle, second deflectors arranged in a substrate, the first deflector transmits light from the optical input terminal to one of the second deflectors selectively, and optical output terminals disposed to receive light from the second deflectors, the second deflectors transmit light from the first deflector to the optical output terminals.

Therefore, the optical switch has same number of optical input and output terminals as the deflectors. As s result, the number of the optical input and output terminals is increased.

BRIEF DESCRIPTION OF THE DRAWING

The objects and features of the invention will become more apparent from the consideration of the following detailed description taken in conjunction with the accompanying drawings in which.

DESCRIPTION OF THE PREFERRED EMBODIMENT

<The first embodiment>

Figure 1:
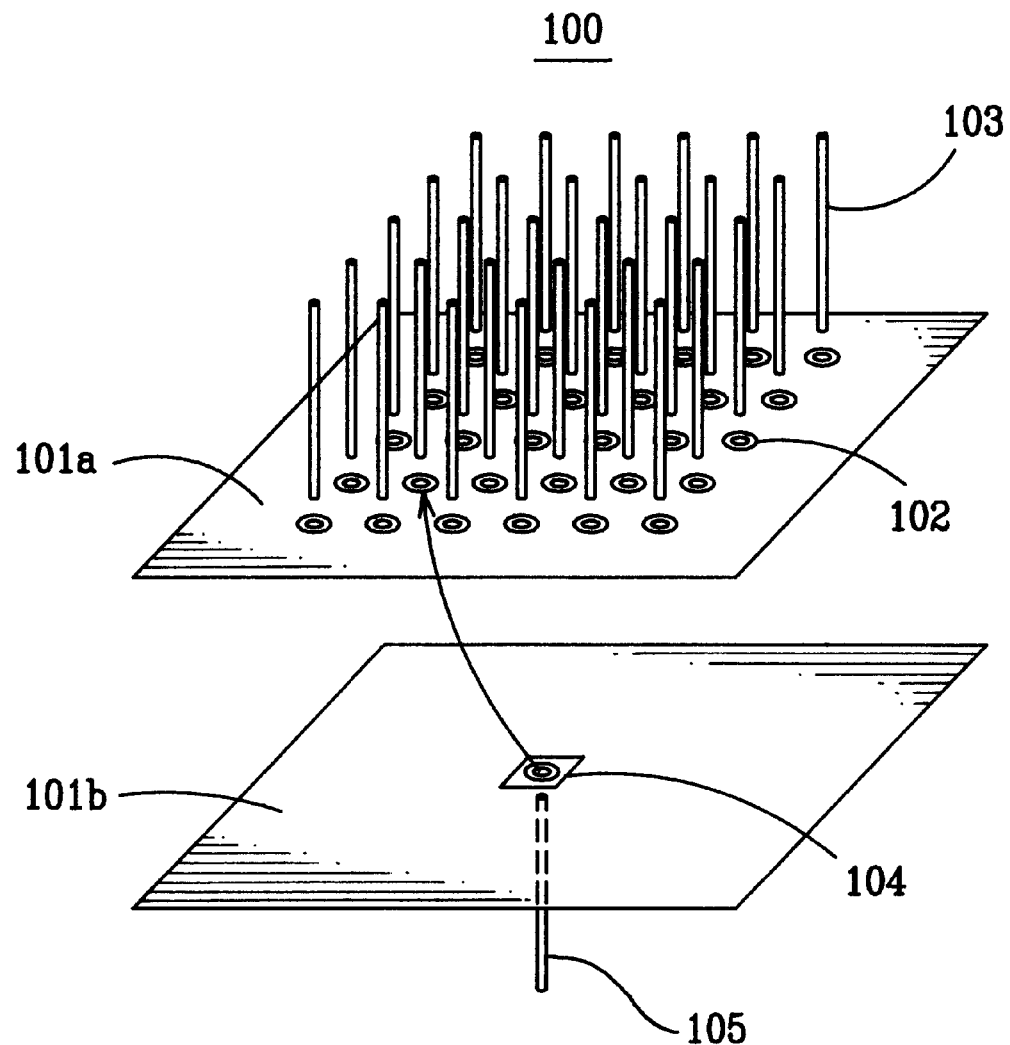
FIG. 1 is an oblique view of a first embodiment according to the invention.

Referring to FIG. 1, the first embodiment of the invention, an optical switch 100 comprises output optical fibers 103, deflector lenses 102, an input optical fiber 105 and a movable lens 104.

The deflector lenses 102 are formed in, for example, a silicon substrate 101a and are arranged in matrix formation. The output optical fibers 103 are disposed in association with the deflector lenses 102 so as to receive light from the lenses 102.

The movable lens 104 is formed in, for example, a silicon substrate 101b. The input optical fiber 105 is disposed in association with the movable lens 104. The movable lens 104 deflects light so as to connect optically between the input fiber 105 and a specified deflector lens 102.

The movable lens 104 changes its position to deflect incoming light. Various types of movable lens based on, for example, micro-mechanical technology can be used as the movable lens 104.

Figure 2:
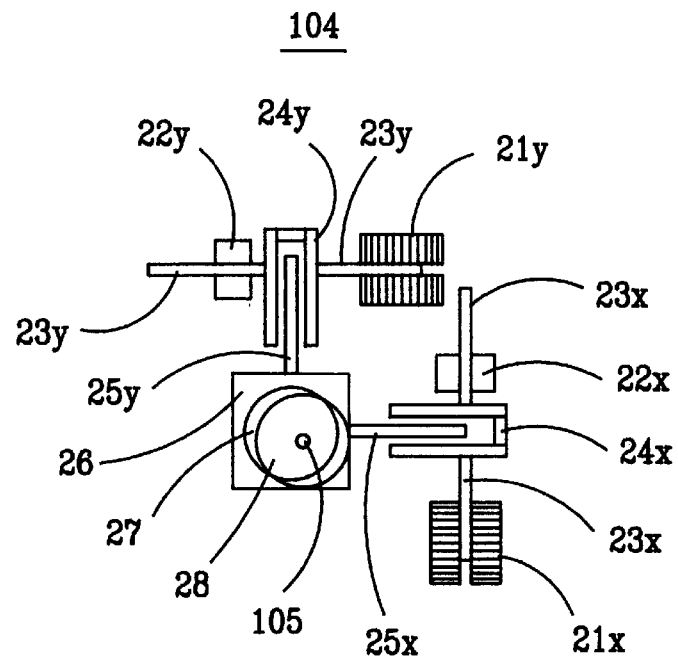
FIG. 2 is a schematic view of a movable lens of the first embodiment.

FIG. 2 illustrates the movable lens 104. In FIG. 2, actuators 21X and 21Y actuate levers 23 X and 23Y by piezoelectric effect so as to move a lens holder 26 in X and Y directions. Sliders 24X and 24Y move levers 25X and 25Y connected to the lens holder 26.

In the first embodiment, the deflector lenses 102 only receive the light from the lens 105. Therefore, the lenses 102 are not required to be movable. The deflector lenses 102 are employed as optical elements which generate refraction or diffraction. For example, a lens array made by ion exchange or a lens array of CGH (Computer Generated Hologram) type is employed for the deflector lenses 102.

Figure 3:
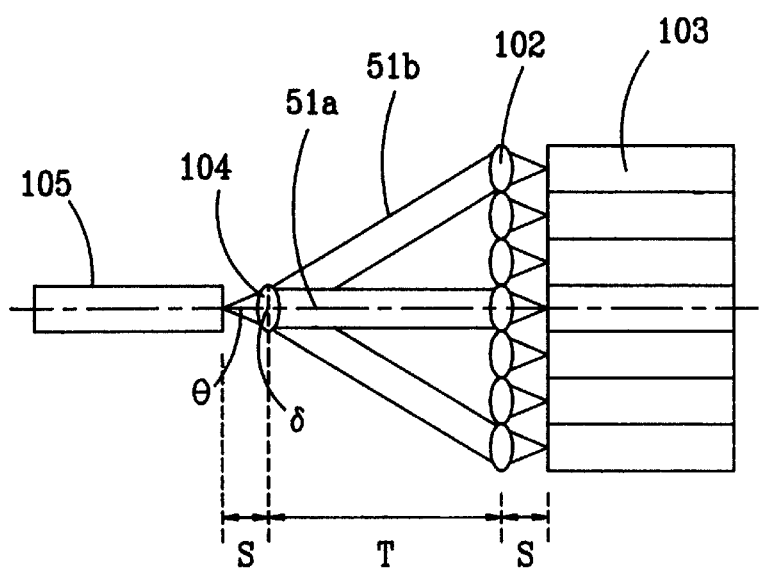
FIG. 3 is a schematic view illustrating steering of light by the movable lens of the first embodiment.

Referring to FIG. 3, the steering of the light by the lens 104 is described.

Because of distance between a central axis of luminous flux and a central axis of the movable lens 104, the luminous flux is deflected to direction 51b from direction 51a.

Operating the actuator 21X and 21Y, the movable lens 104 is moved in X and Y directions. Therefore, the luminous flux is deflected in −X and −Y directions on a plane of the substrate 101b. When distance between the input optical fiber 105 and the movable lens 104 is S and amount of the gap of those axes is δ, deflection angle θ is $\tan^{-1}(\delta/S)$. For example, when the distance S is about 500 μm and the gap δ is 10 μm, the deflection angle θ is about 1 degree. In FIG. 3, a reference symbol T represents distance between the movable lens 104 and the lens 102.

<The second embodiment>

Figure 4:
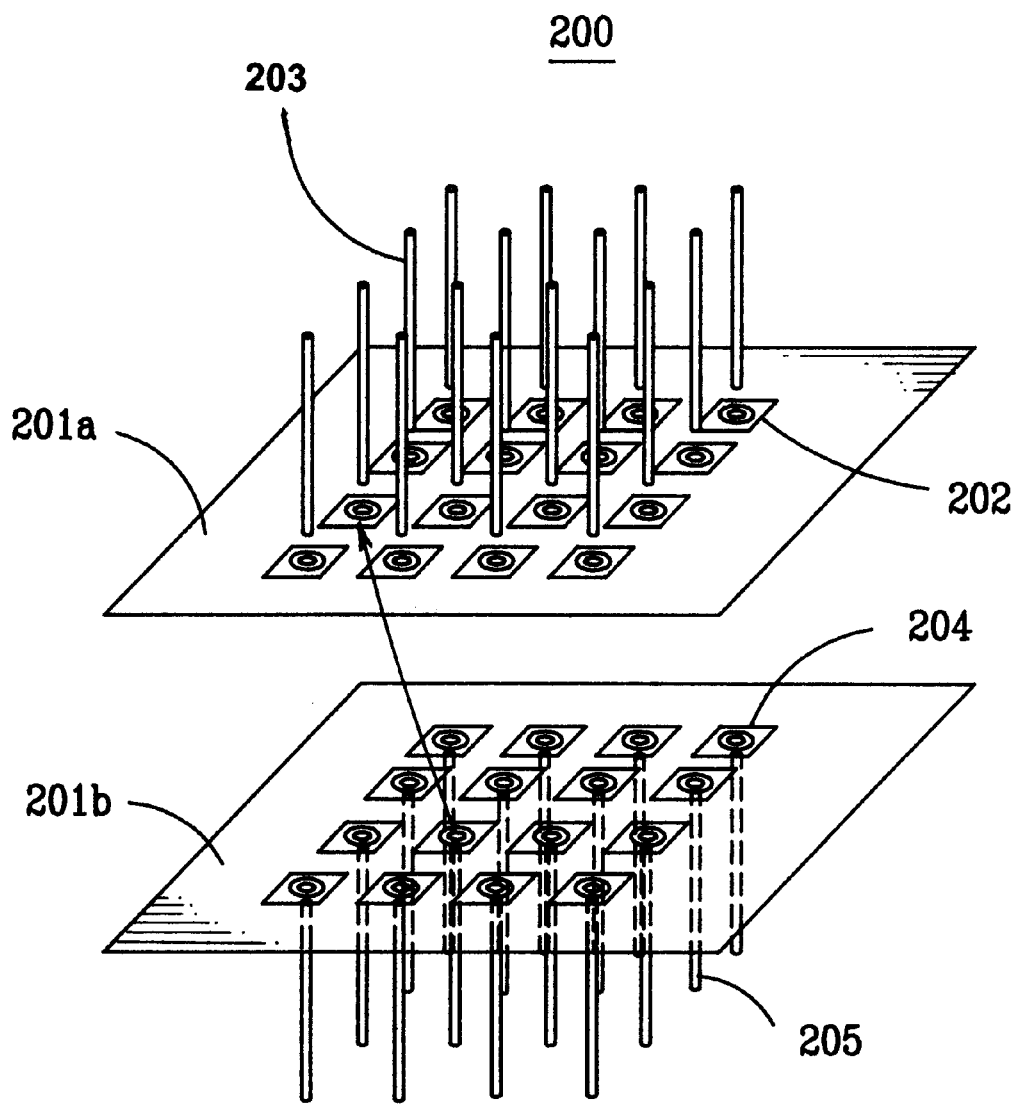
FIG. 4 is an oblique view of a second embodiment according to the invention.

Referring to FIG. 4, the second embodiment of the invention, an optical switch 200 further comprises plural input optical fibers 205.

Plural deflector lenses 202 are formed in, for example, a silicon substrate 201a and are arranged in matrix formation. Output optical fibers 203 are disposed in association with the deflector lenses 202 so as to receive light from lenses 202.

The movable lenses 204 are formed in, for example, a silicon substrate 201b and are arranged in matrix formation.

The input optical fibers 205 are disposed in association with the movable lens 204. The movable lenses 204 deflect light so as to connect optically between the input fibers 205 and a specified deflector lens 202.

In the second embodiment, the deflector lenses 202 are movable so as to receive light from any of the input optical fibers 205. The structure of the deflector lenses 202 and the movable lenses 204 are same as the movable lens 104 in the first embodiment.

Figure 5:
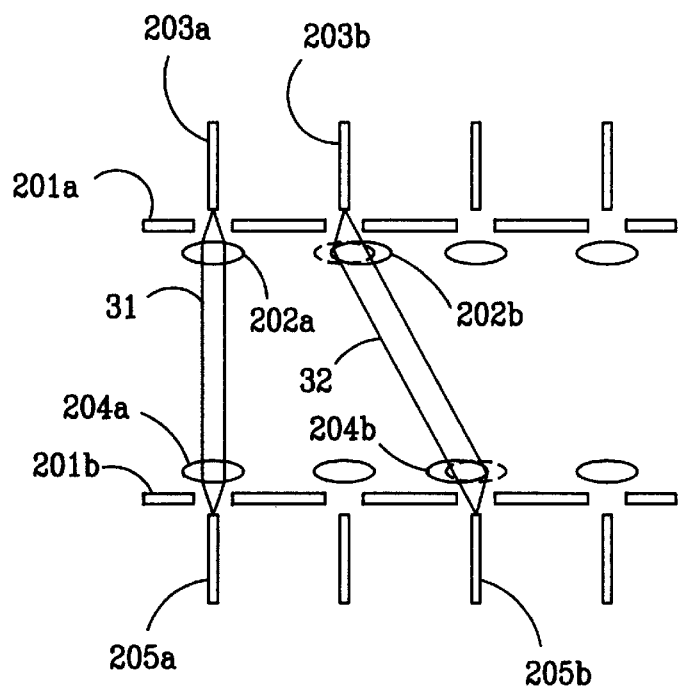
FIG. 5 is a schematic view illustrating deflection of light by the second embodiment.

Referring to FIG. 5, the deflection through the lenses 202 and 204 described. Light 31 from an input fiber 205a enters an output fiber 203a through the movable lenses 204a and 202a. In this case, the lenses 202a and 204a are in those initial positions. On the other hand, light 32 from an input optical fiber 205b enters an output optical fiber 203b through the movable lenses 204b and 202b. In the latter case, the lenses 202b and 204b change the position so as to deflect the light 32 from the input fiber 205b to the output fiber 203b.

<The third embodiment>

Figure 6:
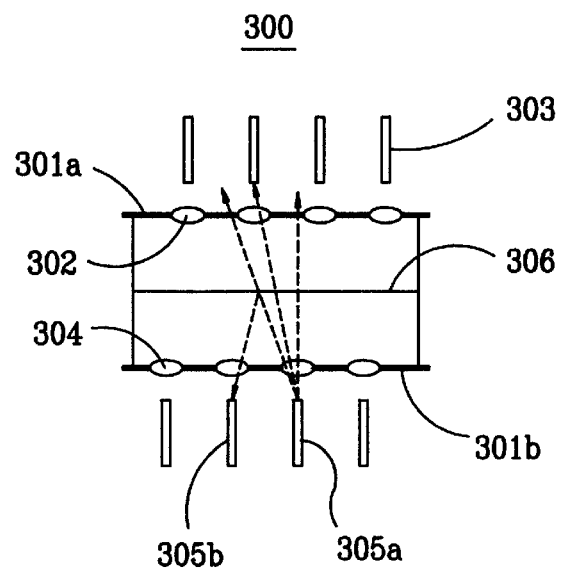
FIG. 6 is a schematic view of a third embodiment according to the invention.

Referring to FIG. 6, the third embodiment of the invention, an optical switch 300 is described.

Plural deflector lenses 302 are formed in, for example, a silicon substrate 301a and are arranged in matrix formation. Output optical fibers 303 are disposed in association with the deflector lenses 302 so as to receive light from the lenses 302.

The movable lenses 304 are formed in, for example, a silicon substrate 301b and are arranged in matrix formation. The input optical fibers 305 are disposed in association with the movable lens 304. The movable lenses 304 deflect light so as to connect optically between the input fibers 305 and a specified deflector lens 302.

In the third embodiment, the deflector lenses 302 are movable so as to receive light from any of the input optical fibers 305. The structure of the optical switch 300 is basically same as the optical switch 200 in the second embodiment.

The optical switch 300 further comprises a reflector 306 disposed between the substrate 301a and the substrate 301b. The reflector 306 has penetrative areas and reflective areas spatially. In FIG. 6, when the movable lens 304 is in a specified position, light form the input optical fiber 305a pass through the reflector 306, and then enters the output optical fiber 301a. When the movable lens 304 is in another specified position, the light from the input fiber 305a is reflected by the reflector 306, and then enters the input optical fiber 305b.

As the reflector 306, for example, a corner-cube or a beamsplitter can be used. Moreover, the reflector 306 may be switched for total reflection or total penetration.

<The fourth embodiment>

Figure 7:
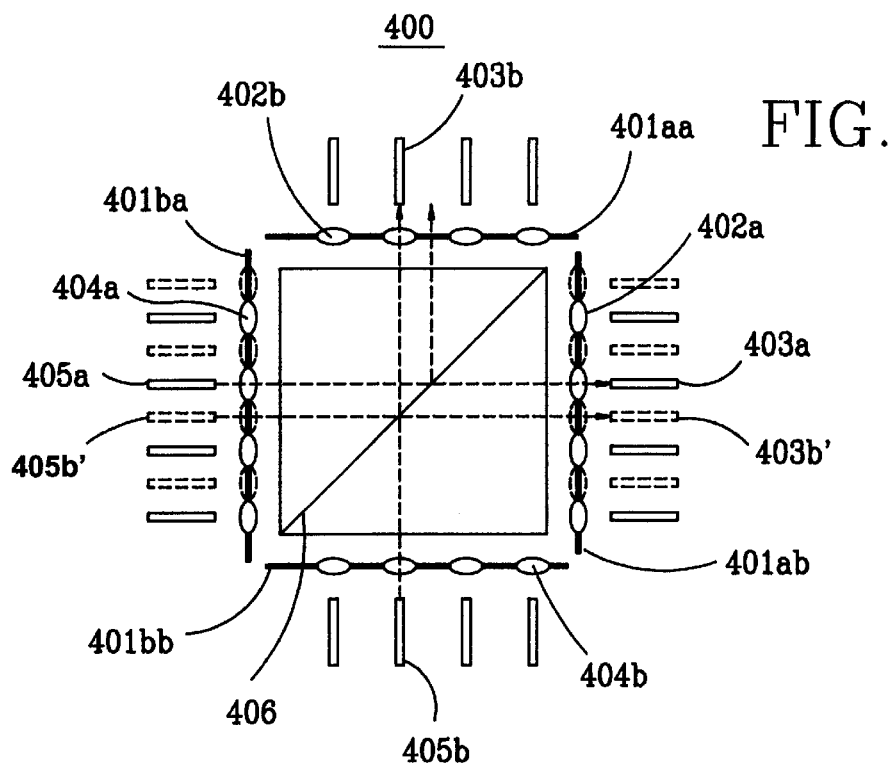
FIG. 7 is a schematic view of a fourth embodiment according to the invention.

Referring to FIG. 7, the fourth embodiment of the invention, an optical switch 400 is described. The optical switch 400 employs two sets of input optical fibers and movable lenses, and two sets of output optical fibers and movable lenses.

First, the two sets of the output optical fibers and the lenses are described. Movable deflector lenses 402b are formed in, for example, a silicon substrate 401aa and are arranged in matrix formation. Output optical fibers 403b are disposed in association with the movable lenses 402b so as to receive light from the lenses 402b. Movable deflector lenses 402a are formed in, for example, a silicon substrate 401ab and are arranged in matrix formation. Output optical fibers 403a are disposed in association with the movable lenses 402a so as to receive light from the lenses 402a.

Then, the two sets of the input optical fibers and the lenses are described. Movable deflector lenses 404a are formed in, for example, a silicon substrate 401ba and are arranged in matrix formation. Input optical fibers 405a are disposed in association with the movable lenses 404a. Movable deflector lenses 404b are formed in, for example, a silicon substrate 401bb and are arranged in matrix formation. Input optical fibers 405b are disposed in association with the movable lenses 404b.

In the optical switch 400, on the output side, the substrates 401aa and 401ab are disposed at right angle. On the input side, the substrates 401ba and bb are also disposed at right angle. The substrate 401aa of the output side is opposite to the substrate 401bb of the input side, and the substrate 401ab of the output side is opposite to the substrate 401ba of the input side. Therefore, the substrates 401aa, 401ab, 401ba and 401bb are arranged in rectangular formation. A beamsplitter 406 is disposed inside the formation.

Light from the input optical fiber 405a enters the output fiber 403a. According to the deflection angle of the lens 404a, split light enters the 403b through the beamsplitter 406. On the other hand, another light from the input optical fiber 405b enters the output optical fiber 403b. According to the deflection angle of the lens 404b, split light enters the 404b through the beamsplitter 406.

In FIG. 7, imaginary input optical fibers 405b' are arranged among the input fibers 405a and imaginary output fibers 403b' are arranged among the input fibers 403a. Then, imaginary light from the imaginary input fiber 405b' enters the imaginary output fiber 403b'.

The imaginary light described above overlaps a mirror image of the light from the input optical fiber 405b to the output optical fiber 403b. Instead of increasing density of the optical fibers connected to the substrate, the optical switch 400 employs two sets of the output optical fibers 405a and 405b, and two sets of input optical fibers 403a and 403b.

Figure 8:
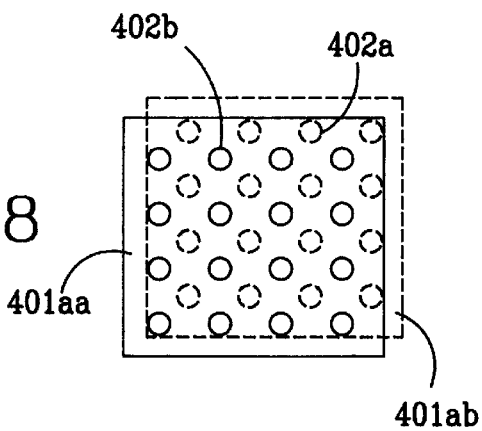
FIG. 8 is a schematic view illustrating locations of movable deflector lenses of the fourth embodiment.

As shown in FIG. 8, locations of the lenses 402b of the substrate 401aa are arranged not to overlap mirror images of the lenses 402a of the substrate 401ab.

Figure 9:
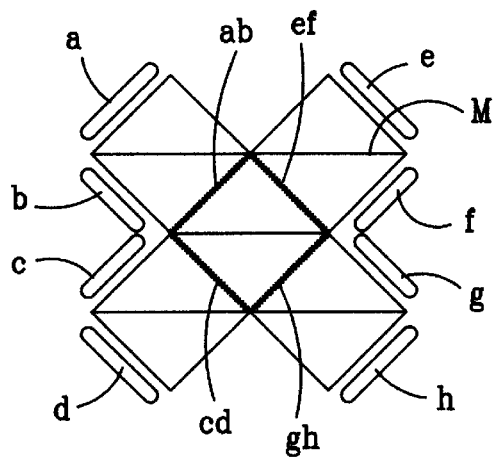
FIG. 9 is a schematic view of a modification of the fourth embodiment.

FIG. 9 shows a modification of the fourth embodiment. In FIG. 9, larger number of the substrates and beamsplitters are employed in order to increase the number of the optical terminals. Reference symbols "a" through "h" represent substrates connected with optical input/output terminals. A reference symbol M represents beamsplitters. A reference symbol ab represents a composite image of the terminals on the substrates a and b. Reference symbols cd, ef and gh represent composite images likewise.

As decribed above, according to the invention, the optical switch has same number of input and output optical fibers as the deflectors. Therefore, comparing to the conventional optical switch, the number of the terminals is increased.

What is claimed is:

1. An optical switch, comprising:
   an optical input terminal;
   a first deflector disposed to receive light from the optical input terminal, and being movable and controlled to selectively change its deflection angle;
   second deflector arranged in a substrate, the first deflector transmitting light from the optical input terminal to one of the second deflectors selectively; and
   optical output terminals disposed to receive light from the second deflectors, the second deflectors transmitting light from the first deflector to the optical output terminals.

2. An optical switch, comprising:
an optical input fiber;
a first deflector disposed to receive light from the optical input fiber, and being movable and controlled to selectively change its deflection angle;
second deflectors arranged in a substrate, the first deflector transmitting light from the optical input fiber to one of the second deflectors selectively; and
optical output fibers disposed to receive light from the second deflectors, the second deflectors transmitting light from the first deflector to the optical output fibers.

3. An optical switch according to claim 2, wherein the second deflectors comprise optical elements which generate refraction.

4. An optical switch according to claim 2, wherein the second deflectors comprise optical elements which generate diffraction.

5. An optical switch, comprising:
first deflectors arranged in a first substrate, and being movable and controlled to selectively change those deflection angles;
optical input fibers disposed in association with the first deflectors to transmit light to the first deflectors;
second deflectors arranged in a second substrate, the first deflectors transmitting light from the optical input fibers to the second deflectors selectively; and
optical output fibers disposed to receive light from the second deflectors, the second deflectors transmitting light from the first deflectors to the optical output fibers.

6. An optical switch according to claim 5, further comprising:
a reflector disposed between the first substrate and the second substrate, which reflects light from one of the optical input fibers to the other of the optical input fibers.

7. An optical switch according to claim 6, wherein the reflector is a corner-cube.

8. An optical switch according to claim 6, wherein the reflector is a beamsplitter.

9. An optical switch, comprising:
first deflectors arranged in a first substrate, controlled to change those deflection angles;
second deflectors arranged in a second substrate, controlled to change those deflectors angles, the first and second substrates are disposed at right angle each other;
third deflectors arranged in a third substrate, controlled to change those deflection angles;
fourth deflectors arranged in a forth substrate, controlled to change those deflection angles, the third and fourth substrates are disposed at right angle each other, the first substrate is opposite to the third substrate, the second substrate is opposite to the fourth substrate;
first optical input terminals disposed in association with the first deflectors;
second optical input terminals disposed in association with the second deflectors;
first optical output terminals disposed in association with the third deflectors;
second optical output terminals disposed in association with the fourth deflectors; and
a beamsplitter disposed among the substrates, splits light from each of the first and second deflectors toward the third and fourth deflectors, locations of the third deflectors are arranged not to overlap mirror images of the fourth deflectors.

\* \* \* \* \*